(12) United States Patent
Haggquist (10) Patent No.: US 7,247,374 B2
(45) Date of Patent: Jul. 24, 2007

(54) ENCAPSULATED ACTIVE PARTICLES AND METHODS FOR MAKING AND USING THE SAME

(75) Inventor: Gregory W Haggquist, Longmont, CO (US)

(73) Assignee: TrapTek LLC, Longmont, CO (US)

( * ) Notice: Subject to any disclaimer, the term of this patent is extended or adjusted under 35 U.S.C. 154(b) by 458 days.

(21) Appl. No.: 10/462,105

(22) Filed: Jun. 12, 2003

(65) Prior Publication Data

US 2004/0018359 A1    Jan. 29, 2004

Related U.S. Application Data

(60) Provisional application No. 60/388,678, filed on Jun. 12, 2002.

(51) Int. Cl.
B32B 5/16 (2006.01)
(52) U.S. Cl. ............... 428/403; 428/404; 428/405; 428/406; 428/407
(58) Field of Classification Search .......... 428/403, 428/404, 405, 406, 407
See application file for complete search history.

(56) References Cited

U.S. PATENT DOCUMENTS

| | | | |
|---|---|---|---|
| 3,783,085 A | 1/1974 | Pearson et al. ............. 161/87 |
| 3,817,211 A | 6/1974 | Brown et al. ............. 118/630 |
| 4,004,324 A | 1/1977 | Bridge et al. ............ 19/156.3 |
| 4,099,186 A | 7/1978 | Edwards et al. .......... 346/74.1 |
| 4,175,055 A | 11/1979 | Goller et al. |
| 4,201,822 A | 5/1980 | Cowsar |
| 4,244,059 A | 1/1981 | Pflaumer ..................... 2/400 |
| 4,342,811 A | 8/1982 | Lopatin et al. ........... 428/220 |
| 4,349,406 A | 9/1982 | Stalter et al. |
| 4,388,370 A | 6/1983 | Ellis et al. |
| 4,396,663 A | 8/1983 | Mitchell et al. .......... 428/111 |
| 4,455,187 A | 6/1984 | von Blücher et al. ...... 156/277 |
| 4,457,345 A | 7/1984 | von Blücher et al. ... 139/420 R |
| 4,460,641 A | 7/1984 | Barer et al. |
| 4,496,415 A | 1/1985 | Sprengling ................ 156/283 |
| 4,510,193 A | 4/1985 | Blücher et al. ............ 428/196 |
| 4,513,047 A | 4/1985 | Leach et al. |
| 4,550,123 A | 10/1985 | Lopatin et al. |
| 4,551,191 A | 11/1985 | Kock et al. ................ 156/276 |
| 4,559,164 A | 12/1985 | Kostelnik et al. |
| 4,610,905 A | 9/1986 | von Blücher et al. ........ 428/90 |
| 4,645,519 A * | 2/1987 | Fraioli et al. ................ 96/146 |
| 4,654,256 A | 3/1987 | Doree et al. |
| 4,698,956 A | 10/1987 | Clarke et al. ................. 57/2 |
| 4,732,805 A | 3/1988 | Maggs |
| 4,774,133 A | 9/1988 | Doree et al. |
| 4,898,633 A | 2/1990 | Doree et al. |
| 4,913,942 A | 4/1990 | Jick |
| 4,920,168 A | 4/1990 | Nohr et al. |
| 5,037,412 A | 8/1991 | Tanzer et al. ............. 604/359 |
| 5,122,407 A | 6/1992 | Yeo et al. |
| 5,126,061 A | 6/1992 | Michael |
| 5,134,031 A | 7/1992 | Kagechi et al. |
| 5,161,686 A | 11/1992 | Weber et al. |
| 5,169,632 A | 12/1992 | Duell et al. |
| 5,249,676 A | 10/1993 | Ashcraft et al. |
| 5,281,437 A | 1/1994 | Singh ........................ 427/180 |
| 5,300,192 A | 4/1994 | Hansen et al. ............. 162/184 |
| 5,300,357 A | 4/1994 | Gardiner |
| 5,304,419 A | 4/1994 | Shores et al. |
| 5,308,896 A | 5/1994 | Hansen et al. ................ 524/13 |
| 5,334,414 A | 8/1994 | Edie et al. .................. 427/189 |
| 5,334,436 A | 8/1994 | Hobbs et al. ............... 428/195 |
| 5,338,340 A | 8/1994 | Kasmark, Jr. et al. ........ 96/135 |
| 5,342,333 A | 8/1994 | Tanzer et al. ............... 604/359 |
| 5,352,480 A | 10/1994 | Hansen et al. ............. 427/202 |
| 5,364,380 A | 11/1994 | Tanzer et al. ............... 604/359 |
| 5,383,236 A | 1/1995 | Sesselmann ................ 2/243.1 |
| 5,391,374 A | 2/1995 | Charbonneau et al. |
| 5,401,505 A | 3/1995 | Duell et al. |
| 5,424,388 A | 6/1995 | Chen et al. |
| 5,432,000 A | 7/1995 | Young et al. ............... 428/372 |
| 5,433,953 A | 7/1995 | Tsuei et al. |
| 5,445,876 A | 8/1995 | Kyricos |
| 5,447,977 A | 9/1995 | Hansen et al. ................ 524/13 |
| 5,462,538 A | 10/1995 | Korpman .................... 604/372 |

(Continued)

FOREIGN PATENT DOCUMENTS

| | | |
|---|---|---|
| DE | 2251 071 | 4/1973 |
| DE | 4008519 | 9/1990 |
| EP | 0144553 A1 | 6/1985 |
| EP | 0341870 A2 | 11/1989 |
| EP | 0389015 A2 | 9/1990 |
| EP | 0330675 B1 | 3/1992 |
| EP | 0509409 A1 | 10/1992 |
| EP | 0682927 A1 | 11/1995 |
| EP | 0 791 681 A2 | 8/1997 |
| EP | 0 962 831 A1 | 12/1999 |
| EP | 1121968 A2 | 8/2001 |

(Continued)

OTHER PUBLICATIONS

Patent Abstracts of Japan, vol. 18, No. 571 of Japanese JP 06207376A, (Jul. 26, 1994).

(Continued)

*Primary Examiner*—Leszek Kiliman
(74) *Attorney, Agent, or Firm*—Fish & Neave IP Group of Ropes & Gray LLP (57) ABSTRACT

The invention relates to preserving the properties of active particles through use of an encapsulant which may be removable. The encapsulant may protect the active particles against premature deactivation. If desired, the encapsulant may be removed to rejuvenate the active particles. Various processes can be implemented to introduce encapsulated particles to embedding substances which may be used in various products.

44 Claims, 5 Drawing Sheets

U.S. PATENT DOCUMENTS

| | | |
|---|---|---|
| 5,482,773 A | 1/1996 | Bair |
| 5,498,478 A | 3/1996 | Hansen et al. ............... 428/372 |
| 5,536,786 A | 7/1996 | Callahan, Jr. et al. |
| 5,538,783 A | 7/1996 | Hansen et al. ............... 428/283 |
| 5,539,930 A | 7/1996 | Sesselmann ................ 2/243.1 |
| 5,571,618 A | 11/1996 | Hansen et al. ............... 428/359 |
| 5,582,644 A | 12/1996 | Gaddis et al. ............... 118/303 |
| 5,589,194 A | 12/1996 | Tsuei et al. |
| 5,589,256 A | 12/1996 | Hansen et al. ............... 428/283 |
| 5,591,146 A | 1/1997 | Hasse ......................... 604/359 |
| 5,591,379 A | 1/1997 | Shores ........................ 252/194 |
| 5,603,992 A | 2/1997 | Woodhall et al. |
| 5,605,746 A | 2/1997 | Groeger et al. |
| 5,609,727 A | 3/1997 | Hansen et al. ............... 162/184 |
| 5,614,570 A | 3/1997 | Hansen et al. ................ 524/13 |
| 5,650,030 A * | 7/1997 | Kyricos ...................... 156/192 |
| 5,678,247 A | 10/1997 | Vickers |
| 5,681,305 A | 10/1997 | Korpman .................... 604/390 |
| 5,709,910 A | 1/1998 | Argyle et al. ............ 427/434.2 |
| 5,714,445 A | 2/1998 | Trinh et al. |
| 5,766,443 A | 6/1998 | Hillrichs et al. |
| 5,783,303 A | 7/1998 | Tsuei et al. |
| 5,790,987 A | 8/1998 | Sesselmann ................ 2/243.1 |
| 5,804,298 A | 9/1998 | Moy et al. |
| 5,804,625 A | 9/1998 | Temperante et al. |
| 5,811,045 A | 9/1998 | Pike |
| 5,863,305 A | 1/1999 | Beardsley et al. ............ 51/294 |
| 5,885,681 A | 3/1999 | Korpman ...................... 428/68 |
| 5,891,221 A | 4/1999 | Rohrbach et al. |
| 5,902,384 A | 5/1999 | Rohrbach et al. |
| 5,919,846 A | 7/1999 | Batlaw et al. |
| 5,925,241 A | 7/1999 | Aldridge et al. |
| 5,945,211 A | 8/1999 | Yamaguchi et al. |
| 5,951,534 A | 9/1999 | Cummings et al. ......... 604/359 |
| 5,951,744 A | 9/1999 | Rohrbach et al. |
| 6,007,590 A | 12/1999 | Sanders, Jr. ................. 51/295 |
| 6,009,559 A | 1/2000 | Sesselmann ................ 2/243.1 |
| 6,017,831 A | 1/2000 | Beardsley et al. ............ 442/68 |
| 6,027,746 A * | 2/2000 | Lech .......................... 424/455 |
| 6,043,168 A | 3/2000 | Colman et al. |
| 6,057,072 A | 5/2000 | Guistina et al. ............ 430/106 |
| 6,080,418 A | 6/2000 | Sengupta et al. |
| 6,127,470 A | 10/2000 | Cobb, III et al. |
| 6,134,718 A | 10/2000 | Sesselmann ................ 2/243.1 |
| 6,207,255 B1 | 3/2001 | Fukuura et al. ............. 428/175 |
| 6,267,575 B1 | 7/2001 | Rooyakkers et al. |
| 6,350,492 B1 | 2/2002 | Gillick et al. |
| 6,391,429 B1 | 5/2002 | Senkus et al. |
| 6,426,025 B1 | 7/2002 | Goeman |
| 6,451,427 B1 | 9/2002 | Takashima |
| 6,468,651 B2 | 10/2002 | Aikawa et al. |
| 6,482,514 B1 | 11/2002 | Matsumoto et al. |
| 6,541,554 B2 | 4/2003 | Morin et al. |
| 6,565,875 B2 | 5/2003 | Tice et al. |
| 6,569,527 B1 | 5/2003 | Calhoun et al. |
| 6,641,842 B2 | 11/2003 | Laridon et al. |
| 6,656,404 B2 | 12/2003 | Morin et al. |
| 6,689,378 B1 | 2/2004 | Sun |
| 6,692,823 B2 | 2/2004 | Kody et al. |
| 6,702,797 B2 | 3/2004 | Williams |
| 6,767,553 B2 | 7/2004 | Sun et al. |
| 6,773,718 B2 | 8/2004 | Seth et al. |
| 6,861,520 B1 | 3/2005 | Todd et al. |
| 2001/0031938 A1 | 10/2001 | DeLucia et al. |
| 2002/0037406 A1 | 3/2002 | Takashima |
| 2002/0197396 A1 | 12/2002 | Haggquist ................... 427/180 |
| 2003/0031694 A1 | 2/2003 | Anderson et al. |
| 2003/0054141 A1 | 3/2003 | Worley et al. |
| 2003/0060106 A1 | 3/2003 | Haggquist et al. |
| 2003/0068353 A1 | 4/2003 | Chen et al. |
| 2003/0088006 A1 | 5/2003 | Yanagisawa et al. |
| 2004/0030022 A1 | 2/2004 | Brittain et al. |
| 2004/0107474 A1 | 6/2004 | Sesselmann et al. |
| 2005/0008776 A1 | 1/2005 | Chhabra et al. |
| 2005/0075027 A1 | 4/2005 | Etchells et al. |

FOREIGN PATENT DOCUMENTS

| | | |
|---|---|---|
| EP | 0943724 B1 | 10/2002 |
| EP | 0959852 B1 | 5/2003 |
| EP | 1198280 B1 | 6/2003 |
| EP | 1115469 B1 | 10/2003 |
| EP | 1135087 B1 | 1/2004 |
| EP | 1403035 A1 | 3/2004 |
| FR | 1 287 139 | 3/1962 |
| GB | 2238802 A | 6/1991 |
| GB | 2338720 A | 12/1999 |
| JP | 59-032921 A | 2/1984 |
| JP | 63-100915 A | 5/1988 |
| JP | 01-299624 A | 12/1989 |
| JP | 03-000057 A | 1/1991 |
| JP | 09-075110 A | 3/1997 |
| JP | 2000-093459 A | 4/2000 |
| JP | 2000-160475 A | 6/2000 |
| JP | 2001-046479 A | 2/2001 |
| JP | 2003-340231 A | 12/2003 |
| WO | WO8604367 A1 | 7/1986 |
| WO | WO 89/12552 | 12/1989 |
| WO | WO9725955 | 7/1997 |
| WO | WO9833644 A1 | 8/1998 |
| WO | WO 98/42909 | 10/1998 |
| WO | WO9939675 A1 | 8/1999 |
| WO | WO0047811 A1 | 8/2000 |
| WO | 01/05583 A1 * | 1/2001 |
| WO | WO 01/05583 A1 | 1/2001 |
| WO | WO0105583 A1 | 1/2001 |
| WO | WO 01/18305 A1 | 3/2001 |
| WO | WO0148025 A1 | 7/2001 |
| WO | WO02083028 A2 | 10/2002 |
| WO | WO02091977 A1 | 11/2002 |
| WO | WO03000979 A2 | 1/2003 |
| WO | WO03007714 A1 | 1/2003 |
| WO | WO 03/027365 A1 | 4/2003 |
| WO | WO2004024278 A2 | 3/2004 |

OTHER PUBLICATIONS

Le Leuch et al., "Removal of target odorous molecules on to activated carbon cloths"; Water Science and Technology, v 50, n 4, 2004, pp. 193-198.

Huang et al., "A new filter media of nonwoven composite with activated carbon fibers"; Journal of Advanced Materials, v 36, n 2, Apr. 2, 2004, pp. 35-38.

Robers, Felix F., "Intelligent textiles"; Textile Horizons, Jul./Aug. 2003, pp. 11-14.

Kulkami, V.G., "Color, functional and multi-attribute solutions for polyester fibers"; Chemical Fibers International, v 53, n 6, Dec. 23, 2003, pp. 452-454.

"Filtertechnik vom Feinsten (The finest filter technology)"; AVR Allgemeiner Vliesstoff-Report, n 6, 2002, pp. 50-51. (Abstract only).

"Micro-encapsulation: the sweet smell of success"; just-style.com Oct. 10, 2001. (Abstract only).

Payne et al., "New durable antimicrobial finish for cotton textiles"; American Dyestuff Reporter, v 85, n 6, Jun. 1996, pp. 26-30.

Saito, Mitumasa, "Antibacterial, deodorizing, and UV absorbing materials obtained with zinc oxide (ZnO) coated fabrics"; Journal of Coated Fabrics, v 23, Oct. 1993, pp. 150-164.

Matsumoto et al., "Preparation and characterization of silica-modified activated carbon fibers"; Colloids and Surfaces A: Physicochemical and Engineering Aspects, v 74, n 1, Jul. 6, 1993, pp. 15-21.

McLeod et al., "Charcoal cloth in odour related adsorption"; Filteration and Separation, v 23, n 3, May-Jun. 1986, pp. 164-165.

* cited by examiner

| Sample | Sample Weight (grams) | Carbon Weight in Sample (grams) | Butane Weight Gain (grams) | Butane Activity | CCl4 Activity | Activity Retained |
|---|---|---|---|---|---|---|
| SA-30 | 1.4522 | 0.7288 | 0.0720 | 9.88% | 25.19% | 100.00% |
| (1% SA-30) unwashed | 2.6089 | 0.0261 | -0.0066 | 0% | 0% | 0% |
| (1% SA-30) washed | 2.5517 | 0.0255 | 0.0025 | 9.80% | 24.98% | 99.17% |
| (2% SA-30) unwashed | 2.4670 | 0.0493 | -0.0033 | 0% | 0% | 0% |
| (2% SA-30) washed | 2.7523 | 0.0550 | 0.0031 | 5.63% | 14.36% | 57.00% |
| (3% SA-30) unwashed | 2.8219 | 0.0847 | 0.0007 | 0.83% | 2.11% | 8.37% |
| (3% SA-30) washed | 3.3179 | 0.0995 | 0.0027 | 2.71% | 6.92% | 27.46% |
| (4% SA-30) unwashed | 3.0040 | 0.1202 | -0.0006 | 0% | 0% | 0% |
| (4% SA-30) washed | 3.1480 | 0.1259 | 0.0050 | 3.97% | 10.13% | 40.19% |

FIG. 6

| Sample | Sample Weight (grams) | Carbon Weight in Sample (grams) | Butane Weight Gain (grams) | Butane Activity | CCl4 Activity | Activity Retained |
|---|---|---|---|---|---|---|
| SA-30 | 1.4522 | 0.7288 | 0.0720 | 9.88% | 25.19% | 100.00% |
| (0% SA-30) | 3.7900 | 0.0000 | -0.0006 | 0.00% | 0.00% | 0.00% |
| (2% SA-30) F2 | 3.1689 | 0.0634 | 0.0032 | 5.05% | 12.88% | 51.11% |

FIG. 7

ENCAPSULATED ACTIVE PARTICLES AND METHODS FOR MAKING AND USING THE SAME

CROSS-REFERENCE TO A RELATED PATENT APPLICATION

This application claims the benefit of U.S. Provisional Application No. 60/388,678, filed Jun. 12, 2002, the disclosure of which is hereby incorporated by reference in its entirety.

TECHNICAL FIELD OF THE INVENTION

The invention relates to preserving the properties of active particles. In particular, the invention relates to a method for encapsulating at least a portion of the active particles with a removable protective substance.

BACKGROUND OF THE INVENTION

It is well known that certain particles can be used to add performance properties to materials in different forms such as gases, liquids, and solids. These particles can have properties that are suitable for odor adsorption, moisture management, ultraviolet light protection, chemical protection, bio-hazard protection, fire retardance, antibacterial protection, antiviral protection, antifungal protection, antimicrobial protection, and other factors, and combinations thereof.

These particles can provide such properties because they are "active". Active particles are active because they have the capacity to adsorb or trap substances, including substances that may themselves be a solid, liquid, and/or gas, for example, pollen, water, butane, and ambient air. Active particles have an adsorptive property because each particle has a multitude of pores (e.g., pores on the order of thousands, tens of thousand, or hundreds of thousands per particle). It is these pores that provide the active particle with its capacity to adsorb. For example, an active particle such as activated carbon can adsorb a substance (e.g., butane) by trapping the substance in the pores of the activated carbon.

Exposing the active particles to a substance can prematurely deactivate the active particles by blocking or inhibiting the pores, thus reducing the adsorptive capacity of the active particles. That is, once the pores are blocked or inhibited with a substance, those blocked or inhibited pores may be prevented from further adsorption. However, the adsorptive capacity of active particles can be increased or restored by removing the substance that is blocking or inhibiting the pores. Hence, active particles can be rejuvenated (e.g., reactivated).

A common problem often associated with active particles is that they can be prematurely deactivated. When active particles are premature deactivated, the particles cannot adsorb substances originally intended to be adsorbed, but instead, adsorbed some undesired substance. Some substances that are prematurely adsorbed may be deleterious substances. Deleterious substances are substances that cannot be easily removed from an active particle and therefore reduce the active particle's capacity for further adsorption. For example, a deleterious substance such as a molten polymer may permanently deactivate active particle. A molten polymer, for example, cannot be removed without damaging the active particle or the substance surrounding the active particle.

Other substances that are prematurely adsorbed may be relatively easy to remove. That is, these types of substances can be removed using known methods of rejuvenation or reactivation that do not damage the active particles or the surrounding substance. For example, when a non-deleterious substance such as methane is adsorbed, it may be removed from the active particle by heating the particle.

Advances in producing materials with active particles contained therein have been limited by adverse conditions encountered when making such materials. One such process includes, for example, an extrusion process that is used to produce strands of synthetic yarn. In an extrusion process, the process typically begins by converting a base material, such as a polymer, into a molten mixture. Then, using the molten mixture, a desired material (e.g., yarn) is extruded through an extrusion apparatus. However, when the active particle is mixed into a molten mixture, the molten mixture can deactivate the active particle by filling the particle's pores, thus inhibiting the active particle's ability to adsorb.

Various extrusion approaches have been attempted to prevent active particle deactivation, but all have produced results that are ineffective or substantially weaken the base material. One approach, using activated carbon, has yielded a material having about 4% of the activated carbon by weight embedded therein as active. However, this approach required a heavy loading of activated carbon in order to produce a yarn that has at best only 4% activity out of all the carbon embedded within the yarn. A drawback of having to heavily load yarn with activated carbon or other active particle is that it results in a yarn that possesses the physical characteristics of the activated carbon (or particle) rather than the physical characteristics of the base material used to produce the yarn. Thus, a yarn or fabric created using this method has a hand and feel dominated by the carbon (or particle) additive and not the base material. Moreover, as the carbon (or particle) loading increases, the tensile strength of the base material decreases, resulting in a brittle, and non-stretching fabric.

In view of the foregoing, it is an object of the invention to preserve active particles with a removable protective substance.

It is also object of the invention to remove the removable protective substance to rejuvenate or reactivate the active particles, when desirable.

It is another object of the invention to provide an active particle that is deactivated with a removable encapsulant for protection against premature deactivation.

SUMMARY OF THE INVENTION

The objects of the invention are accomplished by deactivating active particles with a removable substance (e.g., encapsulant) for protection against premature deactivation. The removable substance, as used on or with the active particles, deactivates the active particles by blocking or inhibiting the pores of the active particles. While the removable substance may have negated or reduced the adsorptive capacity of the active particles, this loss of adsorptive capacity is not permanent. Thus, when the removable substance is removed from the active particles, the adsorptive capacity increases or is restored. In other words, removal of the removable substance results in a reactivation or a rejuvenation of the active particles.

One advantage of deactivating the active particles with the removable substance is that it can prevent the active particles from prematurely adsorbing a substance. If the active particles prematurely adsorb a substance (e.g., a deleterious substance) or are otherwise exposed to an adverse condition affecting adsorption, the particles can deactivate before having an opportunity to adsorb desirable substances. Premature deactivation can include deactivation on account of absorption occurring at an undesirably early time whether or not the absorbed substance was deleterious, non-deleterious or even the intended target. For example, assume that active particles are introduced for the purpose of adsorbing substance "A", but before the active particles can be used for that purpose, the active particles prematurely deactivate by adsorbing substance "B," which is not easily removeable. Had the active particles been deactivated with the removable substance, the active particles may not have prematurely adsorbed substance "B".

When the removable substance is applied to the active particle, it encapsulates at least a portion of the active particle. Thus, an encapsulated particle is an active particle existing in a deactivated state, and has been at least partially filled with, covered by, or enclosed by the removable substance, but can be rejuvenated or reactivated upon removal of the protective substance.

Another advantage of the invention is that the removable substance can be removed at a predetermined or otherwise desirable time after being applied to the active particles. For example, the removable substance may be removed if it is known that the substance or substances that can cause premature deactivation are not present. In another example, the removable substance can be applied to the active particles indefinitely, or for as long as the removable substance can be practically applied to the active particles.

The removable substance may remain applied to the active particles until one or more predetermined conditions or substances are applied to remove the removable substance. For example, the removable substance may be removed if it is subjected to hot water and then dried. In another example, application of heat or light may remove the removable substance. The removable substance may not be displaced by another substance without outside influence unless that other substance first removes, or is specifically configured to remove, the removable substance.

The removable substance enables the encapsulated particles to be subject to substances that can cause premature deactivation. For example, the encapsulated particles may be used in a process that introduces or incorporates the particles into an embedding substance. An embedding substance can be a substance that takes the form of a solid, liquid, gas, or a combination of different phases. If a deleterious substance is used in that process, the encapsulated particles are protected from being prematurely deactivated.

After the encapsulated particles are incorporated into the embedding substance, at least a portion of the removable substance can be removed to reactivate the active particles. Once the removable substance is removed, the active particles can bestow performance enhancing characteristics (e.g., odor adsorption, moisture management, etc.) to the embedding substance or material. In addition to the performance enhancing characteristics that are imparted to the embedding substance, the active particles can be incorporated in a way that maintains the hand and feel, texture, durability, strength, strechability, viscosity, compressibilty, expandability, relative density, and other physical and chemical properties generally associated with the embedding substance before having the active particles incorporated therein.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Active particles are particles that have pores or traps, and have the capacity to adsorb substances in solid, liquid, and/or gas phases, and combinations thereof. These pores can vary in size, shape, and quantity, depending on the type of active particle. For example, some particles naturally have pores, such as volcanic rock, and other particles such as carbon may be treated with extreme temperature and an activating agent such as oxygen to create the pores.

Active particles are particles that can adsorb a substance or have the potential to adsorb a substance.

Active particles can exist in a deactivated state. Although the pores of active particles may be blocked or inhibited from adsorbing a substance of certain molecular size in a deactivated state, this does not imply that these pores are permanently precluded from adsorbing that substance. The pores of the active particles can be unblocked or uninhibited through reactivation or rejuvenation. Reactivation or rejuvenation removes substances that are trapped in the pores of the active particles. However, if a deleterious substance is adsorbed by the active particles, it is unlikely that reactivation or rejuvenation can restore the adsorptive capacity of the active particles.

Active particles can provide performance enhancing properties such as odor adsorption, moisture management, ultraviolet light protection, chemo-protective properties, bio-hazard protective properties, fire retardance, antibacterial protective properties, antiviral protective properties, antifungal protective properties, antimicrobial protective properties, and combinations thereof. The active particles can include, but are not limited to, activated carbon, graphite, aluminum oxide (activated alumina), silica gel, soda ash, aluminum trihydrate, baking soda, p-methoxy-2-ethoxyethyl ester Cinnamic acid (cinoxate), zinc oxide, zealites, titanium dioxide, molecular filter type materials, and other suitable materials.

Figure 1:
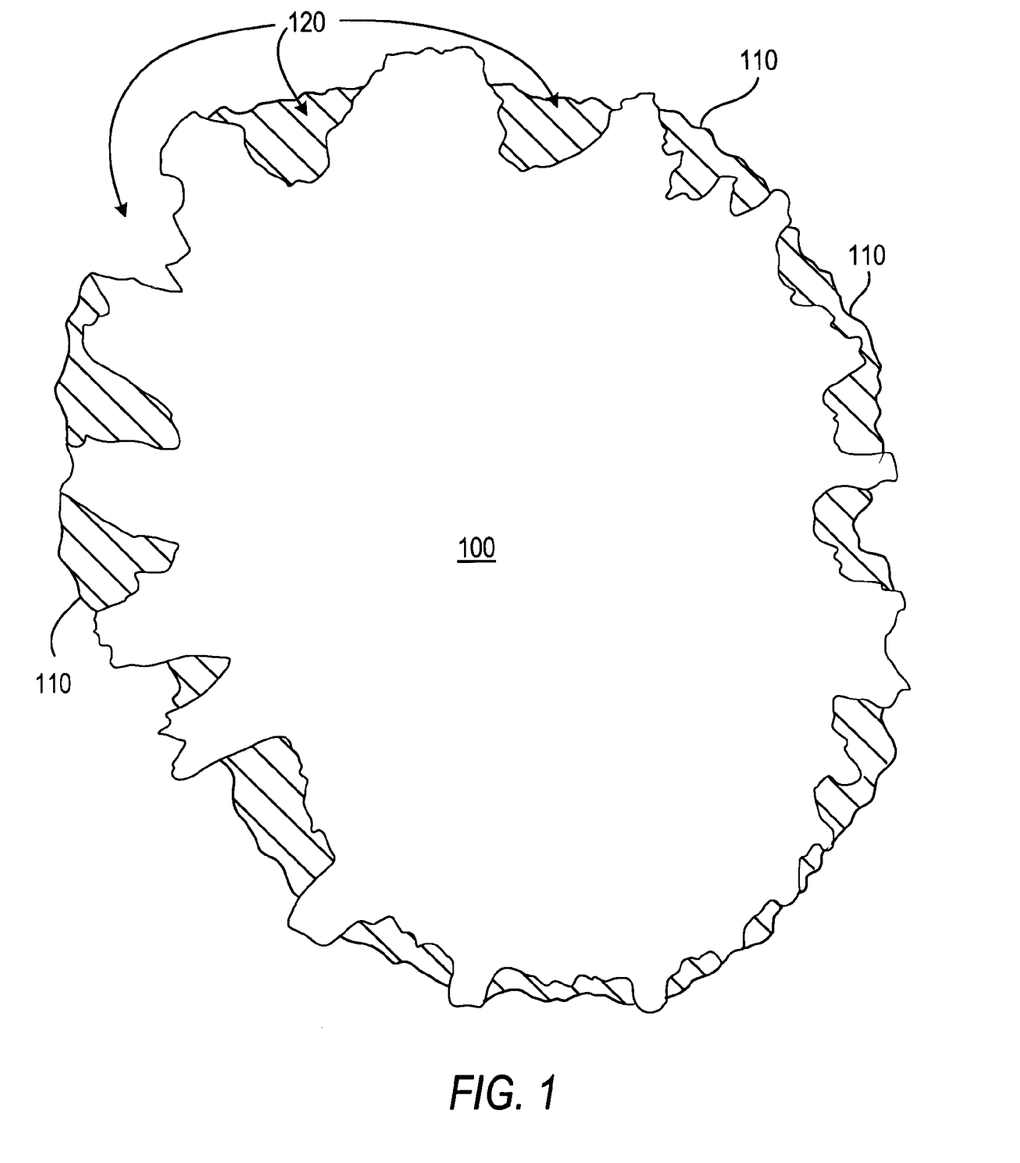
FIG. 1 shows a cross-sectional view an active particle that is encapsulated in accordance with the principles of the present invention.

FIG. 1 shows a cross-sectional view of a portion of an active particle 100 having pores 120 dispersed throughout the periphery of the particle. As shown in FIG. 1, at least some of pores 120 are filled by encapsulant 110 (e.g., a removable substance). Pores 120 may remain filled until the encapsulant is removed. The encapsulant can fill at least a portion of each pore 120, fill at least a portion of pores 120, fill all pores 120, cover portions of particle 100, or encompass the entire particle 100.

An encapsulant is a removable substance that preserves the properties associated with the active particles by preventing the active particles from being prematurely deactivated (e.g., prevents deleterious or unintended substances from being adsorbed or deactivate through other adverse conditions). The encapsulant can be removed from the active particles at a predetermined time and when subject to application of one or more predetermined conditions (e.g., heat, time, etc.) or substances (e.g., water, light, etc.).

The encapsulant can include, but is not limited to, water-soluble surfactants, surfactants, salts (e.g., sodium chloride, calcium chloride), polymer salts, polyvinyl alcohols, waxes (e.g., paraffin, carnauba), photo-reactive materials, degradable materials, biodegradable materials, ethoxylated acetylenic diols, and any other suitable substances. Specific examples of such encapsulants that are suitable for encapsulating the active particles include the Surfynol 485W, 485, 2502, and 465 water soluble surfactants, sold by Air Products and Chemicals Corporation, of Allentown, Pa., waxes sold as Textile Wax-W and Size SF-2, by BASF Corporation, of Charlotte, N.C., and waxes sold as model numbers Kinco 878-S and Kinco 778-H by Kindt-Collins Company, of Cleveland, Ohio.

In order to produce a performance enhanced product or material, the active particles are typically incorporated into a base material (e.g., embedding substance). A base material is the substance used to provide a foundation for producing a performance enhanced product or material according to the principles of the present invention. The base material may be one of the primary ingredients used in producing a particular product (e.g., yarn, fiber, foam, fabric, etc.). Note that while the practice of some embodiments of the invention described herein use a base material or embedding substance existing in a solid phase (to produce, for example, an article of clothing), this does not exclude base materials that exist in a liquid or gaseous phase. For example, it may be desirable to use encapsulated particles in a liquid for filter applications.

An advantage of the invention is that the performance enhanced product or material maintains the hand and feel properties of the base material even though it has the active particles embedded therein. In addition to maintaining the hand and feel, texture, durability, strength, strechability, viscosity, compressibilty, expandability, relative density, and other physical and chemical properties of the base material, the base material also exhibits the "active" properties imparted to it by the active particles. Base materials can include, but are not limited to, polyester, nylon, polyacrylic, thermalplastics, PTFE (e.g., Teflon®), polycarbonates, polyalkanes, poly-vinyl compounds, epoxy, siloxane based reaction polymer, glue, cross-linking polymer, polymers, fibers, cotton, acetate, acrylic, aramid, bicomponent, lyocell, melamine, modacrylic, nylon, olefin, PBI, rayon, spandex, water, oil, aerosols, perfumes, or any other suitable materials.

Figure 2:
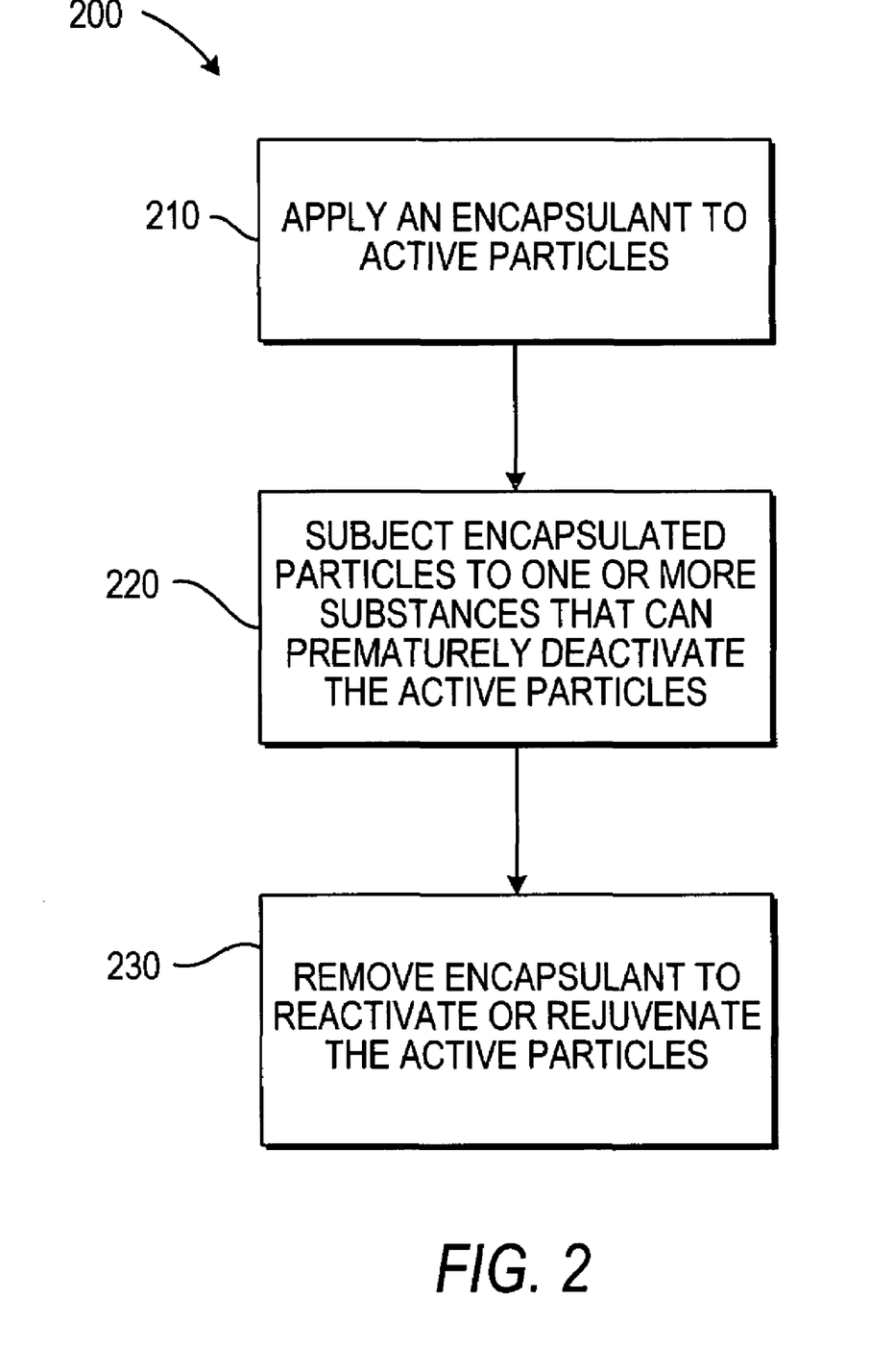
FIG. 2 shows a flowchart of process for preserving active particles to substances that are subjected to substances that can cause premature deactivation in accordance with the principles of the present invention.

FIG. 2 shows a flowchart of a process 200 for preserving active particles that are subjected to substances that can prematurely deactivate the active particles in accordance with the principles of the present invention. Beginning at step 210, an encapsulant is applied to the active particles to preserve the properties of the active particles against premature deactivation. In other words, the encapsulant is applied to deactivate at least a portion of the active particles. The encapsulant can be applied by, for example, mixing the active particles in a bath of the encapsulant, spraying the encapsulant on the active particles, mixing or grinding the active particle in a solution of the encapsulant, or other suitable method.

The degree in which the encapsulant encapsulates the active particles can vary. For example, the encapsulant can fill at least a portion of each pore, fill at least a portion of the pores, fill all the pores, cover portions of each active particle, encompass the entire active particle, or encapsulate using combinations thereof. The regions of the active particle in which the encapsulant has been applied are blocked or inhibited from further adsorption. Thus, these particular regions of the active particle are in a deactivated state and are protected from premature deactivation.

At step 220, the encapsulated particles are subjected to one or more substances (e.g., deleterious substances or substances not intended for immediate adsorption) that can prematurely deactivate the active particles. When the encapsulated particles are subjected to step 220, the portions of the active particles that have been previously deactivated by the encapsulate are unable to further adsorb. Thus, these encapsulated portions of the active particles are preserved and can be reactivated at a predetermined and/or later time.

Several advantages are realized by being able to preserve the properties of active particles while being subjected to step 220. For example, the encapsulated particles can be exposed to a process (e.g., extrusion process) that uses deleterious substances. In another example, the encapsulated particles can be exposed to deleterious substances for extended periods of time and still be reactivated. In yet another example, the encapsulated particles can be introduced to an embedding substance without losing its "active" properties. In yet another example the "active" properties can be turned on at a desired time, precluding the need for special packaging and/or handling instrucions.

At step 230, the encapsulate can be removed to reactivate or rejuvenate the active particles. The encapsulant can be removed from the active particles at a predetermined and/or later time and when subject to application of one or more reactivation agents (e.g., application of heat, light, time, water, bacteria, etc.). For example, the encapsulant may be removed immediately after being subjected to step 220. If desired, the encapsulant may be removed according to a predetermined time schedule. For example, the encapsulate may be removed after being subjected to a predetermined condition a certain number of times such as wash and dry cycles performed by a user. If two or more different encapsulants are applied to each active particle or to separate groups of active particles (i.e., each group having its own type of encapsulant or encapsulants) at step 210, different reactivation agents may be needed to remove the encapsulants. For example, light can be used to remove a first encapsulant and hot water can be used to remove a second encapsulant. This facilitates control over the timing of reactivation which can be beneficial for changing, maintaining, or otherwise controlling performance characteristics of a product incorporating the particles.

Removing the encapsulant rejuvenates the pores of the active particles and bestows the performance enhancing characteristics of the active particles to the embedding substance, without damaging the embedding substance. The degree to which the encapsulate is removed may vary. For example, the encapsulate may be removed from only the portions of the encapsulated particles that is exposed to the ambient environment, leaving intact the encapsulant that is secured to the embedding substance.

To promote removal of the encapsulant from the active particles, the encapsulant may be soluble in different types of solvents such as water (e.g., steam), super critical $CO_2$, liquid nitrogen, and the like. In another embodiment, a light source (e.g., incandescent, ultra-violet, infra-red, etc.) can be used to remove the encapsulant from the active particles. In yet another embodiment, biological materials can be used to remove bio-degradable materials. For example, bacteria can be used to consume and dispose of the encapsulant. In another embodiment, the encapsulant may degrade with time, with or without external influence, thereby enabling a time dependent reactivation.

Using an encapsulant having a low affinity (via van der Waals forces and/or hydrogen-bond interactions) for the active particles may facilitate removal of the encapsulant. More particularly, the affinity of the encapsulant may be of a nature that enables the encapsulant to adhere to the active particles while subjected to a deleterious substance (e.g., molten base material), but facilitates removal without damaging the embedding substance and the active particles.

The encapsulant may have a similar or higher glass transition temperature (Tg) than an embedding substance. The glass transition temperature is the temperature at which an embedding substance such as a polymer changes from (or to) a viscous or rubbery condition to (or from) a hard and relatively brittle material. Having an equal or higher glass transition temperature enables the encapsulant to maintain its application to the active particles when subjected to a substance that can cause premature deactivation.

Note that the above steps of process 200 are illustrative and that steps may be added, deleted, or combined.

In an alternative embodiment, the active particles need not be encapsulated before being subjected to a substance that can cause premature deactivation. If desired, unprotected active particles, substances that can cause premature deactivation, and encapsulant can be mixed simultaneously. Although the active particles are mixed with potentially prematurely deactivating substances, the encapsulant can have a faster diffusion rate than that of the potentially prematurely deactivating substances. Thus, the encapsulant may fill the pores of the active particles faster than the substances (e.g., deleterious substances). This advantageously provides for simultaneous mixture of active particles, encapsulant, base material, and other ingredients.

A method of applying an encapsulant to active particles, subjecting those encapsulated particles to a substance that can prematurely deactivate the active particles, and then removing the encapsulate after a predetermined period of time can be implemented in a process that introduces or incorporates active particles to an embedding substance. Once the active particles are introduced to these embedding substances, the end product or material has performance enhanced properties imparted to it by the active particles.

Figure 3:
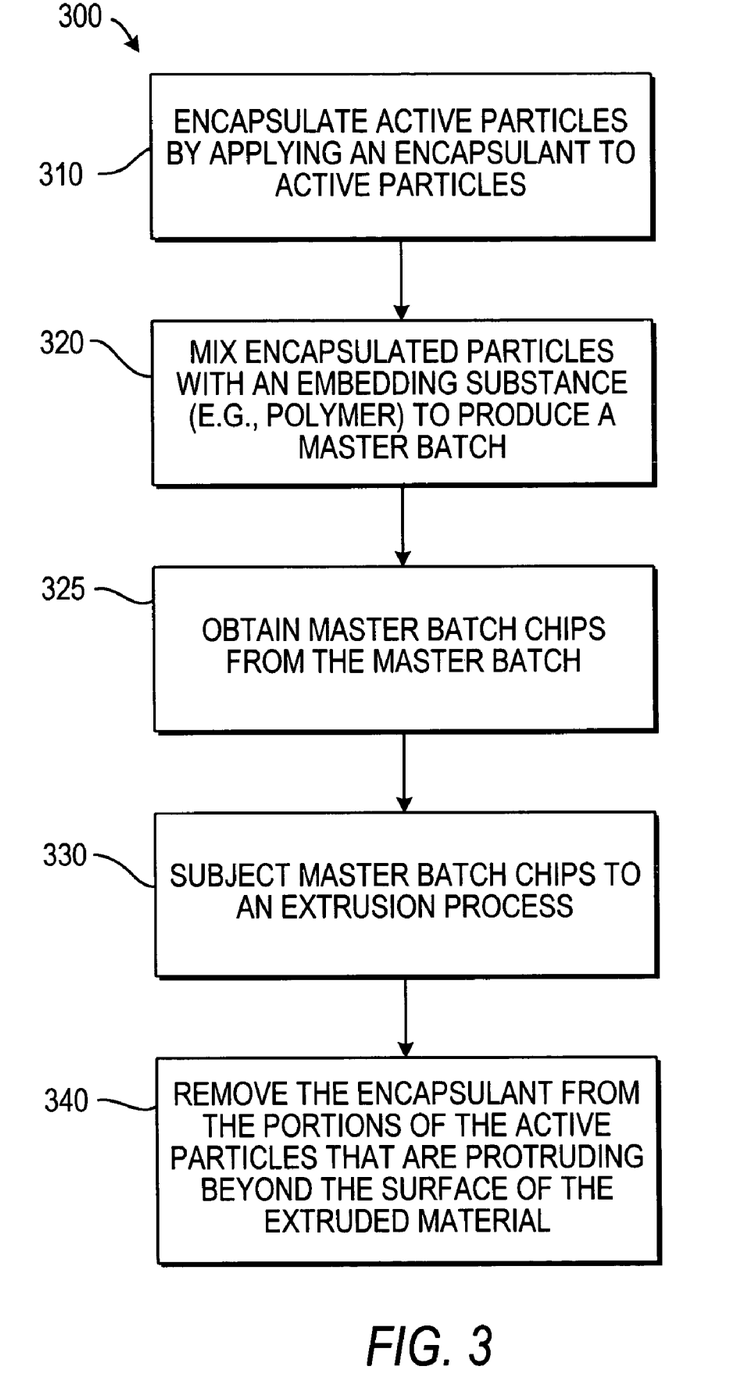
FIG. 3 shows a flowchart of a process for incorporating active particles into an embedding substance in accordance with the principles of the present invention.

FIG. 3 illustrates a process 300 that incorporates the principles of the present invention into an extrusion process.

At step 310 the active particles (e.g., activated carbon) are encapsulated with an encapsulant (e.g., a water-soluble surfactant). This can be done by mixing, for example, the active particles and encapsulant in a vat. If desired, encapsulants with different properties or in different amounts may be applied to the active particles to facilitate variable rejuvenation. Applying encapsulants with different properties or applying encapsulants in different amounts may result in time-delayed rejuvenation in which different encapsulated groups of active particles are reactivated at different times.

At step 320, the encapsulated particles are mixed with a base material (e.g., embedding substance) to create a master batch. The master batch is a predetermined formulation of encapsulated particles and base material. That is, the ingredients of the master batch are mixed together according to a predetermined ratio. For example, 15% of the master batch may be comprised of the encapsulated particles and the remaining 85% may be comprised of the base material. Thus, by extension, the composition (e.g., concentration of active particles) of the enhanced material produced can be controlled with a high degree of accuracy. A manufacturer can readily modify the composition of the master batch to produce an enhanced material that has different concentrations of embedded encapsulated particles.

At step 325, after the master batch is formulated, it is transformed into solid chips or pellets, which are later used in process 300 to create the desired performance enhanced material or product. Note that the terms chips and pellets are merely generic terms, and do not require that the solid form of the master batch take the form of chips or pellets. If desired, the master batch (or any other material used in the extrusion process) may be any suitable shape such as, for example, wafers, spheres, or chunks. Note that the chips obtained from the master batch are referred to herein as master batch chips.

There are several ways in which the encapsulated particles and the base material can be mixed together to create the master batch and subsequently, the master batch chips. Preferably, the master batch is mixed so that the encapsulated particles are sufficiently distributed throughout the base material. This ensures that the master batch chips obtained from the master batch are substantially consistent from one chip to another.

One method of mixing involves subjecting the encapsulated particles and the base material to a predetermined temperature and a predetermined pressure for a predetermined period of time. The predetermined temperature and pressure are such that the base material is in a molten or viscous state. A base material becomes molten when the solid base material exhibits flow or movement. That is, the molecular bonds that comprise the solid structure of the base material begin to move against one another, thereby exhibiting a molten characteristic. When the base material is in a molten state, it serves as a molten suspension that facilitates dispersion of the encapsulated particles during mixing. In other words, this molten mixing process is akin to mixing a bowl of soft ice cream with a handful of nuts, where the ice cream represents the base material, and the nuts represent the encapsulated particle. As the two ingredients are mixed together, the nuts become dispersed throughout the ice cream.

After the encapsulated particles are mixed, the master batch chips are obtained. One method for obtaining master batch chips from the molten mixture is to place the mixture in a cold bath of a solution that does not dissolve the base material or the encapsulant. Then the cooled mixture can be ground down to a predetermined size.

Another method for creating the master batch involves producing a liquid dispersion (e.g., slurry). The liquid dispersion can be formed by mixing the base material, a solvent (e.g., glycol, polyglycol, water, etc.) and encapsulated particles. The base material may turn into a slurry when the solvent is added. This slurry can serve as a liquid suspension that facilitates dispersion of the encapsulated particles. After the encapsulated particles are mixed throughout the slurry, the master batch chips can be obtained by a precipitation process.

Note that the above-described methods for mixing encapsulated particles and base material are merely illustrative, and by no means represent the only way in which a master batch and master batch chips can be produced. For example, two or more different master batches that have different types or concentrations of encapsulants (such as encapsulants or combinations of encapsulants having different requirements for removal), active particles, and/or base materials may be combined in a final product. Using two different master batches, an article of clothing can be knitted using a yarn obtained from a first master batch and a yarn obtained from a second master batch.

Note that the encapsulant preserves the active particles as they are mixed with the base material by preventing the base material from entering the pores during formation of the master batch. The encapsulant preserves the active particles during the extrusion process, which is described in step 330.

Figure 4:
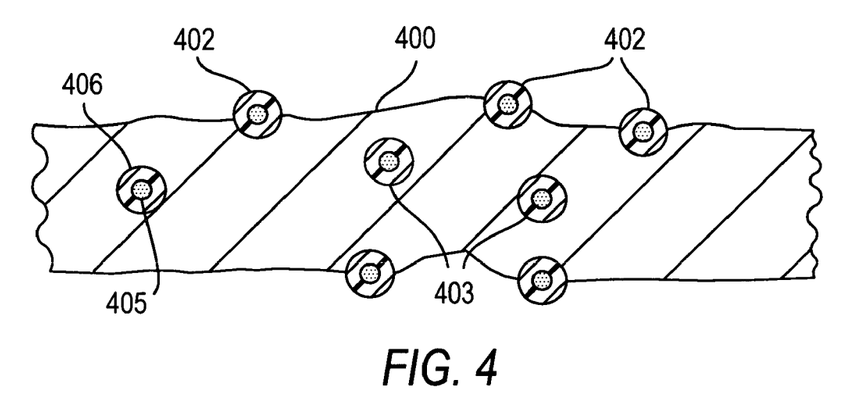
FIG. 4 shows a cross-sectional view of a section of fiber with encapsulated particles embedded therein in accordance with the principles of the present invention.

At step 330, the master batch chips are subjected to an extrusion process that produces a material or product having encapsulated particles embedded therein. The extrusion process can be used to produce, for example, one or more strands of yarn or fiber, a sheet of fabric, various assortments of solid shapes (e.g., tablets), and plastics (e.g., bags, bottles, automotive parts, etc). Various molding methods view of fiber 400 having encapsulated particles embedded therein. Particularly, fiber 400 has encapsulated particles 402 that extend beyond the outer surface of fiber 400 and encapsulated particles 403 that are fully contained within fiber 400. As shown in FIG. 4, each of the encapsulated particles has an active particle 405 (e.g., activated carbon) and an encapsulant 406 (e.g., water soluble surfactant).

The distribution of the encapsulated particles throughout a section of fiber 400 may vary depending on any number of variables (e.g., concentration of particles used, size of the fiber, etc.). One skilled in the art will appreciate that a material produced by an extrusion process can have any distribution of encapsulated particles that extend beyond the outer surface of the material, or are exposed to the ambient environment, and encapsulated particles that are fully contained within the base material.

Referring back to FIG. 3, at step 340, the encapsulant is removed from the encapsulated particles that extend beyond the surface of the extruded material or that are exposed to the ambient environment. At this stage, the encapsulant of encapsulated particles contained within the extruded base material need not be removed because the base material has completely enclosed the encapsulated particle, preventing it from being exposed to the ambient environment. However, if those enclosed encapsulated particles are later exposed on the surface, they may then later be rejuvenated. For example, ordinary wear and tear may strip away layers or portions of the base material or encapsulant to expose new particles on the surface. The concept of stripping or peeling away layers to expose new active particles can be used to form different shapes from the master batch chips.

The extrusion process typically involves subjecting the master batch chips to a predetermined temperature and pressure for a predetermined period of time to produce a molten mixture that includes base material (e.g., polymer) and encapsulated particles. If desired, additional base material (e.g., a pure form of a particular base material) may be added to the master batch chips to dilute the concentration of encapsulated particles. The added base material may also be in the form of chips, which may be the same base material used to create the master batch or may be a different base material. If the pure chips are added, they too are subjected to the predetermined temperature and pressure for the predetermined period of time.

After the chips (e.g., master batch chips and/or pure chips) are ground and diluted to the desired concentration of active particles, the chips are extruded. The chips can be extruded to produce a variety of materials such as fabric and yarn. For example, if the extrusion apparatus is configured to produce yarn, the chips may be extruded into fibers that are intertwined to form the yarn. Thus, the end product obtained from the extrusion process results in a material that has encapsulated particles embedded therein.

The extruded material has the encapsulated particles embedded within the base material (e.g., embedding substance). Some of the encapsulated particles may be fully contained within the extruded material and other particles may extend beyond the outer surface of the base material or are exposed to the ambient environment. For example, FIG. 4 shows a cross-sectional have several practical applications. For example, using (e.g., abrasing, removing, or treating) the surface of a product may expose enclosed encapsulated particles, which may then be reactivated.

Figure 5:
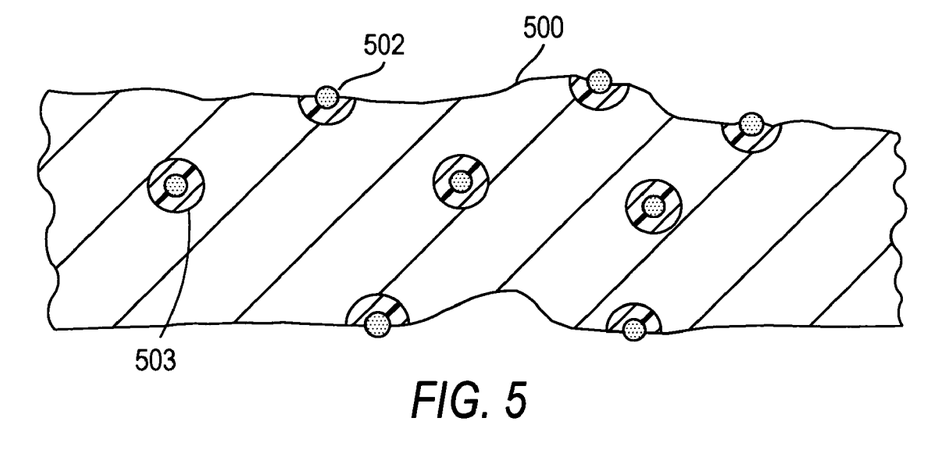
FIG. 5 shows a cross-sectional view of a section of fiber with encapsulated particles embedded therein in which the removable substance is removed from the particles extending beyond the outer surface of the fiber or exposed to the ambient environment in accordance with the principles of the present invention.

FIG. 5 illustrates fiber 500 that has had the encapsulant removed from the encapsulated particles that extend beyond the outer surface of fiber 500. That is, the portion of particles 502 that are extending beyond the surface of fiber 500 or that are exposed to the ambient environment no longer have the encapsulant. But particles 503 contained within fiber 500 are still encapsulated.

The encapsulant can be removed using a rejuvenation process. Steam can be used as an effective rejuvenation agent to remove the encapsulant. For example, a slashing system can be used to apply steam to an array of yarn strands that are produced by the extrusion process. The application of steam can be used, for example, to remove a water soluble encapsulant such as water-soluble surfactant, salt, polymer salt, or polyvinyl alcohol. In yet another example, the encapsulant may be removed by subjecting the extruded material to a hot water bath. In another example, a super critical $CO_2$ can be used as a solvent to dissolve the encapsulant. Multiple washings and alternative treatments may be required to remove certain encapsulants. This can be useful in time-release rejuvenation processes.

Note that due to adsorption of deleterious substances and other factors, rejuvenation of some active particles may not result in complete restoration of the active particle's original activity. However, it has been found that it is not necessary for the active particle to regain full pre-encapsulated activity in order to impart the performance enhancing properties to the base material.

The above-described extrusion process is one example of an enhanced material producing process in which the encapsulation method of the present invention can be implemented. Discussed below are other processes in which the principles of the present invention can be used. For example, an air dispersion process, a padding method process, and a combined solvent/encapsulated solid application method are discussed.

The principles of the present invention can be incorporated into an air dispersion method for treating an embedding substance. In general, an air dispersion method (a) entrains active particles in a gaseous carrier, (b) disposes a first face of an embedding substance (e.g., a woven fabric) with the entrained gaseous carrier, (c) maintains a pressure drop across the embedding substance from the first face to a second face of the embedding substance so that at least some of the entrained active particles are incorporated into the embedding substance, and (d) fixes the active particles to the embedding substance. The above description of the air dispersion method is not intended to be a comprehensive explanation, but merely an illustrative example of such a method. A person skilled in the art will appreciate that air dispersion methods can be performed in a number of different ways. A detailed explanation of an air dispersion method can be found, for example, in U.S. Patent Application Publication No. 20030060106, published Mar. 27, 2003, the disclosure of which is hereby incorporated herein by reference in its entirety.

The fixing step, referred to above at step (d), is the step that permanently attaches the particles to the embedding substance. In one approach, this step may be implemented by using a solution that contains a binding agent and a solvent (e.g., water). This solution is applied to bind the particles to the embedding substance. The binding agent serves as the "glue" that secures the particles to the embedding substance, but the water serves as the "carrier" for carrying the binding agent through the embedding substance to the particles. Because the solution is mostly comprised of the solvent, the solution has the propensity to pull away from the active particles as it is adsorbed by the embedding substance, exposing portions of the encapsulant. Thus, as the solvent is absorbed by the embedding substance, it also carries the binding agent away from the particle (e.g., the solution pulls away from the portion of the particle that is not in direct or nearly direct contact with the embedding substance). However, the portion of the encapsulated particle that is in contact with the embedding substance may be unable to shed the solution. This advantageously enables the binding agent to form a bond between the particle and the embedding substance while exposing encapsulant.

The process of fixing can cause unprotected active particles to deactivate. For example, if the solution does not dry quick enough, the binding agent may seep out of the embedding substance and enter the pores of unprotected active particles. This problem can be avoided by encapsulating the particles prior to being entrained in the gaseous carrier.

Therefore, applying the encapsulant to the active particles before being subjected to the air dispersion process can promote preservation of the active particles while being subjected to a substance that can cause premature deactivation. After the encapsulated particles are attached to the embedding substance, rejuvenation agents can be applied to remove the encapsulant. Thus, any portions of the encapsulated particles that are not covered by the binding agent are removed, which results in exposing those particular portions to the ambient environment.

The principles of the present invention can be incorporated into a padding method that is used to treat an embedding substance. The padding method involves passing a material (e.g., yarn, fabric, etc.) through a bath of active particles. As the embedding substance passes through the bath, the active particles adhere to the embedding substance. The padding process can agitate the particle bath to prevent formation of channels that could prevent adequate active particle incorporation. In addition, the padding method can impress the active particles into the embedding substance with a roller as it passes through the padding chamber.

The active particles can be permanently attached to the embedding substance through application of a binding agent. The binding agent is typically applied to the embedding substance as a solution either before or after the embedding substance passes through the padding chamber. The same fixing method as that described above in conjunction with air dispersion method can be applied to this method. The above description of the padding process is not intended to be an exhaustive discussion, but merely serves to provide an illustrative example in how a padding method can be implemented. A detailed discussion of the padding method can be found, for example, in U.S. patent application publication No. 20020197396, published Dec. 26, 2002, the disclosure of which is hereby incorporated herein by reference in its entirety.

Note that the solution (e.g., binding agent and solvent) has the potential to prematurely deactivate the active particles. However, encapsulating the active particles prior to their application to the padding process can reduce the potential for premature deactivation. After the encapsulated particles are permanently fixed to the material, the encapsulant is removed.

As discussed above in connection with the air dispersion method, the binding agent is unlikely to encompass the entire particle because the embedding substance (e.g., yarn) wicks up the solution. Therefore, when a rejuvenation agent is applied, it is able to remove the encapsulant not covered by the binding agent.

The encapsulation method of the present invention can be used in applications that apply a combined mixture of active particles and a binding agent to an embedding substance (e.g., fabric). This combined mixture is sometimes referred to as a liquid suspension. This suspension can, for example, be sprayed onto the embedding substance, can be applied to the embedding substance by a roller or other applicator, or can be used as a bath in which embedding substance can be submersed. Past attempts to use this liquid suspension have resulted in premature deactivation of the active particles because once the particles are immersed in a solution, the active particles can be prematurely deactivated.

Active particles that are encapsulated with an encapsulant (e.g., a wax) prior to being immersed in the liquid suspension can retain their performance enhancing properties while being subjected to conditions (e.g., binding agent) that would otherwise prematurely deactivate the active particles. Hence, an encapsulated particle and solution mixture can advantageously be used to apply performance enhancing particles to an embedding substance using a means that applies the liquid suspension. Having a propensity to adhere to the embedding substance, the solution will pull away from the encapsulated particles and leave a portion of the encapsulant exposed to the ambient environment. This exposed encapsulant is then removed to reactivate those parts of the active particles.

This combined encapsulated particle and binding agent suspension can be used, for example, in a modified version of the above-mentioned padding method. More particularly, the padding method can be altered such that the material is padded with the liquid suspension as it passes through the padding chamber. Thus, by using the liquid suspension, there may be no need to pad the material with active particles and the binding agent in two separate steps. The liquid suspension can be applied in one step.

The principles of the present invention can also be incorporated into a xerographic method for treating an embedding substance. The xerographic method uses the principles of electrostatic or magnetic attraction to transfer a toner formulation from a hopper to a drum assembly. The drum assembly is an electrically charged or magnetically polarized assembly that rotates at a predetermined speed. As the drum assembly rotates, the toner formulation is attracted to and retained by selective (e.g., magnetically or electrically charged) portions of the assembly. Then, as the assembly continues to rotate, it impresses the toner formulation onto the embedding substance. Then the embedding substance is subjected to heat which causes the toner formulation to be permanently fixed to the material (e.g., binding agents in the toner formulation plasticize and bind the particles to the embedding substance). A detailed discussion of the xerographic method can be found, for example, in U.S. Patent Application Publication No. 20020197547, published Dec. 26, 2002, the disclosure of which is hereby incorporated herein by reference in its entirety.

The toner formulation includes, but is not limited to, active particles (e.g., activated carbon), binding agents, and additives such as charge control particles, magnetic control particles, and/or coloring agents. Applying the principles of the present invention, the active particles can be encapsulated with an encapsulant (e.g., a wax) prior to being added to the toner formulation. This encapsulant can preserve the properties of the active particles while they are being permanently attached to the embedding substance.

Using the above-mentioned encapsulation method, various treated embedding substances such as fabrics (e.g., woven and non-woven), yarn, foam, bags, plastic components, aerosols, liquid substances (e.g., water in filters), gaseous substances (e.g., perfume), and other objects can be made. For example, a treated yarn can be used to weave a garment such as a sock. Such a sock can adsorb unpleasant odors that may emanate from a person's foot. In another example, encapsulated particles can be kept in an air freshener that sprays encapsulated particles into a desired location. Then after a particular rejuvenation condition or substance is applied, the encapsulated particles are reactivated.

Embedding substances having active particles incorporated therein according to this invention can be used in other applications such as, for example, upholstery, carpeting, rugs, mats, linens, sheets, towels, rags, pet beds, mattress pads, mattresses, home furnishings, curtains, furnace filters, shoes, insoles, and diapers. The treated materials can also be used in clothing such as shirts, pants, blouses, undergarments (e.g., t-shirts, underwear, bras, etc.), hats, and other clothing related items. Protective suits such as biochemical protective suits, and anti-irradiation suits (i.e., suits that provide protection against infrared radiation) can be constructed using the treated materials. In addition, hunting gear can be made using the treated materials of the present invention. Moreover, filters can be constructed with treated materials. Such filters can be used in vacuum cleaners to trap pollen and other particles. Filters can be used in laboratories using hazardous biological materials; the active particles may entrap the biological agents and prevent them from escaping into the atmosphere. Other filters may use encapsulated particles embedded within the substance to be filled, such as a water filter.

Persons skilled in the art will appreciate that the above-mentioned applications for the treated yarn of the present invention is not an exhaustive list, but merely an exemplary description of possible applications.

The following provides illustrative examples in which the present invention can be applied to preserve the properties of particles that are being incorporated into a base material using the methods described above. These examples are for the purposes of illustration only and are not to be construed as limiting the scope of the invention in any way.

EXAMPLE 1

This example shows that a performance enhanced synthetic yarn was produced according to the process of FIG. 3. More particularly, this example shows that the method of encapsulating the activated carbon, mixing it with a polyester base material to form master batch chips, extruding the master batch chips to produce the desired yarn, and removing the protective encapsulation layer from the exposed activated carbon particles was performed. The yarn obtained through this example showed substantial adsorptive capacity in addition to exhibiting the physical characteristics associated with the polyester base material. Thus, the yarn had the hand and feel of the polyester, but also had performance enhanced qualities (e.g., odor adsorption) imparted to it by the activated carbon.

The activated carbon used in this example is sold as model number SA-30 by CarboChem Corporation, of Ardmore, Pa. The SA-30 was further jet milled and classified such that 97% of the carbon particles had a mean size less than 10 microns in diameter. Thus, 97% of the SA-30 used in this example had a diameter of less than 10 microns.

The activated carbon was then mixed with an encapsulant to encapsulate the carbon particles. The encapsulant used in this example is a water-soluble surfactant sold as Surfynol 485W by Air Products and Chemicals Corporation, of Allentown, Pa. The water-soluble surfactant sufficiently coated the surface of the activated carbon particles such that the pores were at least partially encapsulated, thereby protecting the SA-30 from any deleterious conditions. The quantity of water-soluble surfactant used was equivalent to about 20% of the total weight of the activated carbon used to create the master batch. Note that while this particular example used an encapsulant that accounted for 20% of the carbon weight used in the master batch, it is understood that different quantities or concentrations of encapsulant can be used. In this example, water-soluble surfactant concentrations ranging from about 20% to about 100% were tested, but the 20% concentration was found to yield the best results. It is also noted that the particular size of the carbon particles and the type of encapsulant being used may warrant different quantities or concentrations.

After the activated carbon particles were encapsulated, the encapsulated particles were mixed with a polyester base material to create the master batch. The base material used in this example is sold as blank PET by Americhem Corporation, of Charlotte, N.C. The master batch was formulated such that the activated carbon accounted for 15% of the total weight of the master batch. For example, if the master batch weighed 1000 grams, 150 grams of the master batch weight would be attributed to the carbon.

After the encapsulated carbon was thoroughly mixed with the polyester base material, the mixture was converted into master batch chips. These master batch chips were then extruded from an apparatus having 76 holes in addition to the 100% polyester. The fibers were drawn through this apparatus at a draw ratio of 4-to-1 (e.g., for every meter of fiber pulled through the apparatus, the fiber stretched to four meters in length). This particular draw ratio resulted in each fiber having a denier of 4.4.

Note that the chips with the encapsulated carbon were passed through a 40 micron filter using temperature and pressure without clogging the filter. The chips flowed through the filter because they where subjected to a predetermined pressure and temperature, which caused the chips to exhibit flow.

Polymer chips were added to dilute the concentration of the encapsulated carbon particles contained within the extruded fibers. Note that the master batch chips had a carbon concentration of about 15%. Thus, if fiber were drawn solely from the master batch chips, the carbon concentration of the fiber would be about 15%. Therefore, adding polymer chips to the master batch chips during the extrusion process resulted in fiber having a carbon concentration less than 15%. In this example, the extrusion process was performed four times, with each process performed to obtain a fiber with a different carbon concentration. Here, the four separate extrusion processes resulted in fibers having a carbon content of 1%, 2%, 3%, and 4%.

After the 76 fibers were extruded, they were then knitted into a tubular fabric (e.g., a sock). After the tubular fabric was knitted, an approximate 100 square centimeter section was cut out each of the four tubular fabrics for testing. Thus, four fabrics having different carbon concentrations (e.g., 1%, 2%, 3%, and 4%) were tested in this example.

The activity of the carbon contained within the fabrics was determined using the American Standard for Testing and Materials (hereinafter "ASTM") test for determining the activation level of activated carbon. This test was re-approved as the standard for testing the activation level of activated carbon in 2000 and has the designation D 5742-95 (hereinafter "the ASTM method"). In general, the ASTM method determines the activity of the activated carbon by determining the butane activity. According to ASTM, butane activity is defined as the ratio of the mass of butane adsorbed by an activated carbon sample to the mass of the sample. That is, the sample is saturated with butane gas and then measured to determine the mass gain that resulted from adsorption of the butane. Thus, the more butane that is adsorbed indicates a higher level of activity.

Note that previous standards for measuring the activity of activated carbon was performed using carbontetrachloride ($CCl_4$). However, $CCl_4$ was found to be too damaging to the ozone layer, therefore butane has supplanted its used. Moreover, there is a direct correlation between $CCl_4$ and butane (i.e., one unit of butane activity is equivalent to about 2.55 units of $CCl_4$ activity). Thus, measurements performed using butane can be correlated to measurements that used $CCl_4$.

Using the ASTM method, the activity of the SA30 was measured in its powder form before being subjected to the master batch formulation process. The weight gain of butane adsorbed by the SA-30 powder was 0.0988 grams of butane per gram of SA-30. This resulted in a 9.88% butane activity value or a 25.19% $CCl_4$ activity value.

Figure 6:
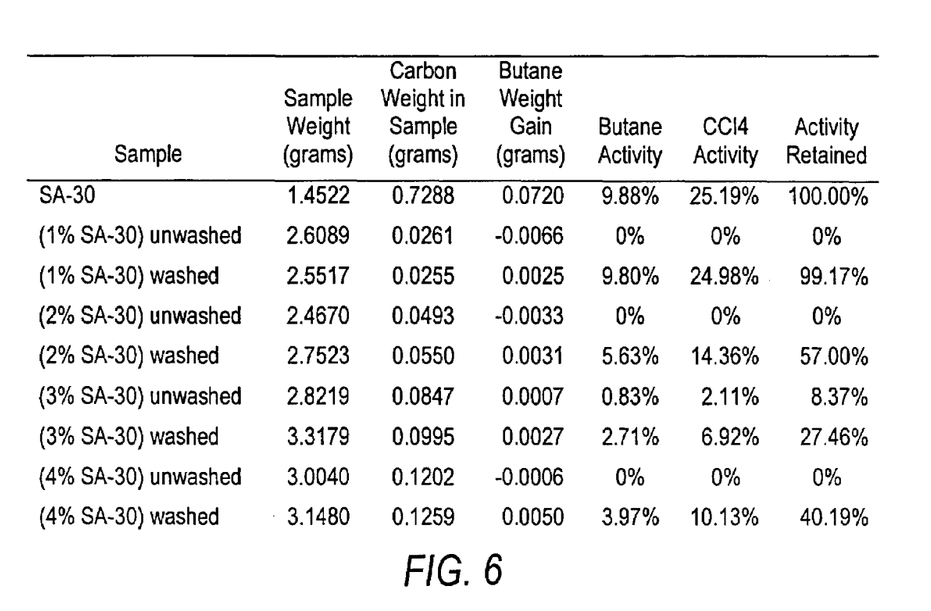
FIG. 6 shows data obtained from an experiment the was performed in accordance with the principles of the present invention.

FIG. 6 shows a table of data obtained on an unprocessed sample (e.g., pure SA-30) and the 1%, 2%, 3%, and 4% samples. In this example, the weight of each sample (e.g., combined weight of fabric and carbon), the weight of the carbon in each sample, the butane weight gain of each sample was measured. These weight values are shown in FIG. 6. Based on the measured weights, the butane and $CCl_4$ activity and the retained activity of each sample was calculated. The butane activity was calculated by dividing the butane weight gain by the measured carbon weight of the sample. The $CCl_4$ activity was calculated by multiplying the butane activity by 2.55. The retained activity was calculated by comparing the butane activity of the sample to the butane activity of the SA-30 powder. These calculated values are also shown in FIG. 6.

The above-mentioned weights were measured for each diluted sample before and after a wash and dry cycle. The data in FIG. 6 indicates whether a particular sample was washed or not. The wash cycle included washing the sample in a hot-water wash for 14 minutes using the large load water level and one cold-water rinse cycle. The washing machine used to wash the samples is sold as Kenmore Series 90 residential washing machine by Sears Corporation. The samples were dried on a high heat setting for 45 minutes using a clothes dryer. The dryer used in this example is sold as a Kenmore Series 90 residential dryer by Sears Corporation.

The data tabulated in FIG. 6 indicates that the unwashed samples showed little or no butane activity. In addition, the unwashed samples did not retain activity. Negligible activity was realized because the encapsulate was still encapsulating the sample, thereby isolating the pores from the ambient environment.

The samples were washed to remove the water-soluble surfactant and thereby exposed the activated carbon. The 1%, 2%, 3%, and 4% SA-30 samples show respective butane activities of 9.80%, 5.63%, 2.71%, and 3.97%, thus indicating that the activated carbon retained activity after being subjected to molten polyester during formation of the master batch and during the extrusion process. As shown in FIG. 6, the activity retained for the 1%, 2%, 3%, and 4% SA-30 samples were 99.17%, 57.00%, 27.46%, and 40.19%, respectively.

Note that, in general, as the carbon loadings in the samples increased (e.g., the 4% sample had more carbon than the 3% percent sample, and the 3% sample had more carbon than the 2% sample, and so on), the butane adsorption increased. The data shows that the more heavily loaded samples adsorbed more butane than the lesser loaded samples, despite the lower levels in butane activity for the heavier loaded samples. The butane activity of the more heavily loaded samples may have decreased relative to the lesser loaded samples because more carbon was completely enclosed by the base material and thus was not exposed to the ambient environment after washing.

EXAMPLE 2

Figure 7:
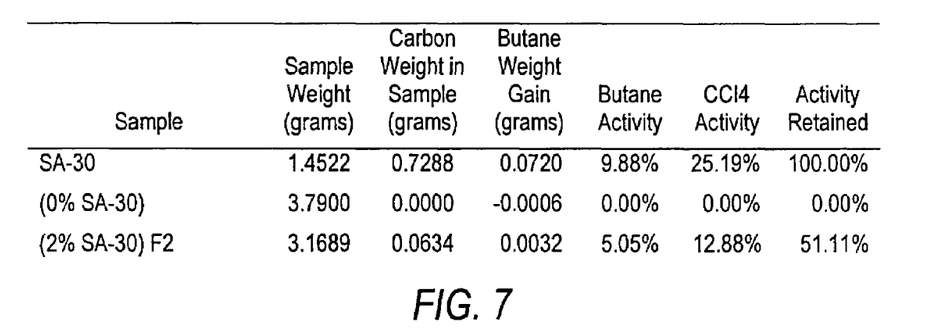
FIG. 7 shows data obtained from another experiment that was performed in accordance with the principles of the present invention.

A procedure similar to that set forth in Example 1 was repeated, but a different master batch was created by using a different encapsulant. The results of this example are shown in FIG. 7. The master batch used in this example used the same classified SA-30 carbon as that used in Example 1 and a encapsulant wax layer sold as Textile Wax W, by BASF, of Charlotte, N.C.

The sample was diluted down to a 2% carbon loading using the above-mentioned master batch. After the extruded fibers were obtained through the extrusion process, the fibers were knitted into a tubular fabric (e.g., sock). Even though the fibers where drawn at 4-to-1 ratio, the fibers had a denier of 5, instead of the 4.4 denier realized by the fibers in Example 1. A 100 square centimeter portion of the tubular fabric was removed, washed, and tested.

FIG. 7 shows the same measured weights and calculated activity values as that obtained in Example 1. The data in FIG. 7 also shows data for the pure form of a SA-30 and the data for both samples. In addition, FIG. 7 shows data for a sample consisting purely of polyester. As expected, the polyester sample yielded no adsorptive capacity. The butane activity data of the diluted sample indicated that the encapsulant preserved the activated carbon during formation of the master batch and during the extrusion process.

Thus it is seen that active particles can be protected against premature deactivation. Persons skilled in the art will appreciate that the present invention can be practiced by other than the described embodiments, which are presented for purposes of illustration rather than of limitation, and the invention is limited only by the claims which follow.

I claim:

1. A performance enhanced material comprising:
an embedding substance;
a plurality of active particles in contact with said embedding substance; and
at least one removable encapsulant in an amount effective to prevent at least a substantial portion of said active particles from being substantially deactivated by a substance or matter other than said removable encapsulant prior to removal of said removable encapsulant, and wherein said removable encapsulant is removable to reactivate at least a portion of said portion of active particles.

2. The material according to claim 1, wherein said active particles comprise about 0% to about 100% of said enhanced material.

3. The material according to claim 2, wherein said active particles comprise about 0% to about 50% of said enhanced material.

4. The material according to claim 2, wherein said active particles comprise about 0% to about 25% of said enhanced material.

5. The material according to claim 2, wherein said active particles comprise about 0% to about 10% of said enhanced material.

6. The material according to claim 2, wherein said active particles comprise about 0% to about 5% of said enhanced material.

7. The material according to claim 1, wherein said active particles are selected from the group consisting of activated carbon, graphite, aluminum oxide (activated alumina), silica gel, soda ash, aluminum trihydrate, baking soda, p-methoxy-2-ethoxyethylester Cinnamic acid (cinoxate), zinc oxide, zeolites, titanium dioxide, molecular filter material, and any combination thereof.

8. The material according to claim 1, wherein said embedding substance is selected from the group of polyesters, nylons, polyacrylics, thermalplastics, PTFEs, polycarbonates, polyalkanes, poly-vinyl compounds, epoxies, siloxane based reaction polymers, glues, cross-linking polymers fibers, cotton, acetates, acrylics, aramids, bicomponents, lyocells, melamines, modacrylics, olefins, PBIs, rayons, spandexes, water, oils, aerosols, perfumes and any combination thereof.

9. The material according to claim 1, wherein said active particles provide performance enhancing properties selected from the group consisting of odor adsorption, moisture management, ultraviolet light protection, chemical protection, bio-hazard protection, fire retardance, antibacterial protection, antiviral protection, antifungal protection, antimicrobial protection, and any combination thereof.

10. The material according to claim 1, wherein the active particles comprise activated carbon.

11. A composition comprising:
a base material;
active particles in contact with said base material; and
a removable protective substance in an amount effective to prevent at least a substantial portion of the active particles from being substantially deactivated by a substance or mater other than said removable protective substance prior to removal of said removable protective substance, and wherein said removable protective substance is removable to reactivate at least a subset of said portion of active particles.

12. The composition of claim 11, wherein the active particles comprise activated carbon.

13. The composition of claim 11, wherein the active particles comprise odor adsorbing particles.

14. The composition of claim 11, wherein the active particles comprise antibacterial, antiviral, antimicrobial, or antifungal particles.

15. The composition of claim 11, wherein the active particles comprise chemical protection or bio-hazard protection particles.

16. The composition of claim 11, wherein the active particles are selected from the group consisting of activated carbon, graphite, aluminum oxide (activated alumina), silica gel, soda ash, aluminum trihydrate, baking soda, p-methoxy-2-ethoxyethyl ester Cinnamic acid (cinoxate), zinc oxide, zeolites, titanium dioxide, molecular filter material, and any combination thereof.

17. The composition of claim 11, wherein the base material is selected from the ground consisting of polyesters, nylons, polyacrylics, thermalplastics, PTFEs, polycarbonates, polyalkanes, poly-vinyl compounds, epoxies, siloxane based reaction polymers, glues, cross-linking polymers, fibers, cotton, acetates, acrylics, aramids, bicomponents, lyocells, melamines, modacrylics, olefins, PBIs, rayons, spandexes, water, oils, aerosols, perfumes and any combination thereof.

18. The composition of claim 11, wherein the removable protective substance prevents said substantial portion of the active particles from being at least partially deactivated by said base material.

19. The composition of claim 11, wherein the composition is a master batch.

20. The composition of claim 11, wherein the composition is a yarn or fiber.

21. The composition of claim 11, wherein the composition is a plastic article.

22. The composition of claim 11, wherein the composition is an article of clothing.

23. The composition of claim 11, wherein the composition is a fabric.

24. The composition of claim 11, wherein the composition is a coated fabric.

25. The composition of claim 11, wherein the composition is a coated yarn.

26. The composition of claim 11, wherein the composition is a coated article of clothing.

27. The composition of claim 11, wherein the composition is selected from the group consisting of bags, foam, plastic components, upholstery, carpeting, rugs, mats, sheets, towels, rags, pet beds, mattress pads, mattresses, curtains, filters, shoes, insoles, diapers, shirts, pants, blouses, undergarments, and protective suits.

28. The composition of claim 11, wherein the removable protective substance is a first removable protective substance, and the composition further comprises a second removable protective substance.

29. The composition of claim 11, wherein the active particles have an active property, and the composition has at least one performance property that is attributable at least in part to the active property of the active particles, and wherein the at least one removable encapsulant is removable to provide substantial enhancement of the performance property of the composition.

30. The composition of claim 11, wherein the substance or matter other than the removable protective substance comprises the base material.

31. The performance enhanced material of claim 1, wherein said at least one removable encapsulant prevents the portion of the active particles from being at least partially deactivated by said embedding substance.

32. The composition of claim 1, wherein said performance enhanced material is a master batch.

33. The performance enhanced material of claim 1, wherein said performance enhanced material is a yarn or fiber.

34. The performance enhanced material of claim 1, wherein said performance enhanced material is a plastic article.

35. The performance enhanced material of claim 1, wherein said performance enhanced material is an article of clothing.

36. The performance enhanced material of claim 1, wherein said performance enhanced materials is a fabric.

37. The performance enhanced material of claim 1, wherein said performance enhanced material is a coated fabric.

38. The performance enhanced material of claim 1, wherein said performance enhanced material is a coated yarn.

39. The performance enhanced material of claim 1, wherein said performance enhanced material is a coated article of clothing.

40. The performance enhanced material of claim 1, wherein said performance enhanced material is selected from the group consisting of bags, foam, plastic components, upholstery, carpeting, rugs, mats, sheets, towels, rags, pet beds, mattress pads, mattresses curtains, filters, shoes, insoles, diapers, shirts, pants, blouses, undergarments, and protective suits.

41. The performance enhanced material of clam 1, wherein said at least one removable encapsulant is a first removable encapsulant, and said performance enhanced material further comprises a second removable encapsulant.

42. The performance enhanced material of claim 1, wherein said at least one removable encapsulant protects said portion of active particles from being substantially deactivated by the embedding substance.

43. The performance enhanced material of claim 1, wherein the active particles have an active property, and the performance enhanced material has at least one performance property that is attributable at least in part to the active property of the active particles, and wherein the at least one removable encapsulant is removable to provide substantial enhancement of the performance property of the performance enhanced material.

44. The material according to claim 1, wherein the embedding substance is a polymer.

* * * * *